3,592,873
POLYOXYMETHYLENES CONTAINING LACTAM-LACTONE INTERPOLYMERS
Shinichi Ishida, Tokyo, Kunio Sato, Kawasaki-shi, Hiroshi Komoto, Iruma-gun, Saitama-ken, Hiromichi Fukuda, Tokyo, and Masaki Ishigami, Iruma-gun, Saitama-ken, Japan, assignors to Asahi Kasei Kogyo Kabushiki Kaisha, Osaka, Japan
No Drawing. Filed May 24, 1968, Ser. No. 731,729
Claims priority, application Japan, May 24, 1967, 42/33,492
Int. Cl. C08g 41/04
U.S. Cl. 260—857        4 Claims

ABSTRACT OF THE DISCLOSURE

A thermally stabilized polyacetal composition characterized in that said composition containing a polyamide ester obtained by copolymerizing at least one lactam with at least one lactone, said lactam and lactone having 4 or more membered rings, in the presence of alkali metals, alkali metal derivatives, metallic magnesium or derivatives thereof, as a catalyst.

BACKGROUND OF THE INVENTION

(1) Field of the invention

This invention relates to polyacetal compositions, more particularly, to those into which a polyamide ester is incorporated as a thermal stabilizer.

(2) Description of the prior art

Polyacetal resin has been known as a mouldable composition which is obtained by polymerizing formaldehyde or cyclic oligomers thereof such as trioxane and tetraoxane, or copolymerizing these with copolymerizable monomers, stabilizing the resulting polymer or copolymer to prevent depolymerization thereof from the terminals by treating the terminal groups thereof in various ways, and incorporating antioxidant, thermal and light stabilizers, lubricant, etc., thereinto.

In the production of polyacetal resin, the incorporation of a thermal stabilizer thereinto as well as the terminal groups treating reaction are important and necessary factors for retaining or enhancing qualities of the resin, so that there have been made a number of various propositions heretofore in this regard.

For example, there has been proposed the use of urea or derivatives thereof, hydrazine or derivatives thereof, amides, polyamides, sulfur compounds, or many other compounds, either alone or in combination with antioxidant, ultra-violet ray absorbant and the like.

However, very few of these numerous propositions can be adopted for practical use, since, true as it is they are effective to some extent, the effect afforded is not so significant and endurable.

Among these, certain specific polyamides, e.g. those described in Japanese patent publication No. 5440/1959, are one of stabilizers which may be used practically because of their relatively affirmative effects and durabilities.

Although polyamides are effective for thermally stabilizing polyacetal resin as described above, not all polyamides are necessarily effective and copolyamide derived from at least two or more dicarboxylic acids or diamines are preferable. In fact, only such copolyamides afford stabilizing effect feasible for practical use.

It is presumed that the reason resides in the melting point (softening point) or crystallinity, and those copolyamides having a melting point or a processing temperature in the vicinity of, or lower than those of polyacetal which are 180° C. and 230° C., respectively, are preferable. For example, a terpolymer derived from hexamethylene adipamide, hexamethylene sebacamide and caprolactam shows a good thermal stabilizing effect, among polyamides.

However, such copolyamides showing excellent performance as these still have serious drawbacks.

One of the drawbacks is undesirable coloration thereof when subjected to sole or combined action of heat, light and oxygen, so that when the same is incorporated into polyacetal, there may be caused the undesirable coloration at the time of moulding of the composition or as the lapse of time to degrade qualities of the product considerably.

In the plastics manufacturing, in general, a reclaimed moulding is adopted in enhancing the moulding efficiency, i.e. a runner portion or the like waste in the injection moulding, unsatisfactory or damaged products are reclaimed for remoulding. In this instance, it is highly desirable that the qualities of the product remain unchanged, but, in polyamide-containing polyacetal, the degree of undesirable coloration is considerable.

In a polyamide-containing polyacetal composition, such undesirable coloration or discoloration is observed not only in the processing thereof but also in aging of the shaped articles.

Hence, even though polyamides afford a satisfactory thermal stabilizing effect, they still have serious defects and the disadvantage derived therefrom in that respect as compared with a polyacetal composition containing no polyamide may not be covered up by the advantage afforded.

SUMMARY OF THE INVENTION

It is, therefore, an object of this invention to provide a thermal stabilizing agent for a polyacetal having an excellent stabilizing effect, overcoming the drawbacks accompanied by prior arts.

The thermal stabilizers which may be used in the compositions of this invention are polyamide esters, particularly copolymers of lactam and lactone or multicomponent copolymers comprising at least three components including both lactam and lactone.

Heretofore, polyamide esters obtained by the thermal condensation of a polyamide component such as lactam, $\omega$-amino acid or nylon salt, and $\omega$-oxycarboxylic acid, dicarboxylic acid, diol or lactone has been known. Although there are some which show a fair thermal stabilizing effect among these polyamide esters thus obtained, in general, they tend to a considerable coloration.

The production of these polyamide esters which are free from coloration is difficult, since they are produced by the polymerization at a high temperature and in a high vacuum, and they may not be discolored even after purification by reprecipitating the same.

Hence, it has been difficult to produce colorless polyamide esters in the art similar to the production of colorless polyamide or copolyamides known heretofore.

For the reason mentioned above, the attempt to obtain a polyacetal composition having high qualities and free from coloration capable of affording shaped articles thereof having no coloration by the use of above-mentioned polyamide esters has been arrested.

However, it has now been found that a copolymer of lactam and lactone may be used as a thermal stabilizer free from coloration and capable of affording a composition having less coloring or discoloring tendencies even after a heat treatment thereof, unlike a copolymer of dicarboxylic acid and diamine or glycol.

The lactams which may be used in this invention include lactams or alkyl-substituted lactams which have a four membered ring and are ring-openingly polymerizable, for example, $\alpha$-pyrrolidone, $\alpha$-piperidone, $\epsilon$-caprolactam, ω-lauryllactam, ω-enantholactam, and they are used either solely or in admixture of two or more kinds.

The lactones which may be used in this invention include lactones or alkyl-substituted lactones which have a four membered ring and are ring-openingly polymerizable, for example δ-valerolactone, pivalolactone, ε-caprolactone, ε-enantholactone, ω-lauryllactone, and they are used either solely or in admixture of two or more kinds.

The polymerization of these lactams and lactones referred to above may be carried out in many different ways. For instance, they may be polymerized in a thermal polymerization or, using water or other various compounds as a catalyst.

Preferably, they are polymerized in the presence of alkali metals or hydrides, hydroxides, alkoxides, phenoxides, carbonates thereof or organoalkali metal compounds, such as, metallic sodium, sodium hydroxide, sodium carbonate, sodium hydride, metallic lithium, lithium hydride, sodium methoxide, phenyllithium or n-butyllithium; metallic magnesium, organomagnesium compounds, Grignard reagent or reaction products obtained in the reaction of lactams therewith.

It is of course possible to use promoters such as carboxylic acid esters, gaseous carbon dioxide, isocanate, N-acyllactam, acylamino acid esters, dicarboxylic acid imide, carbamide, carboxylic acid chloride, carbodiimide or other known compounds together with these catalysts mentioned above.

However, polyamide esters obtained by the thermal polymerization or by using water or other compounds as a catalyst, particularly at a high temperature, e.g. above 230° C., tend to be colored considerably. Thus, copolymers obtained by using alkali metals, magnesium or derivatives thereof mentioned above at relatively low temperatures have particularly preferable performances and afford a composition having high qualities.

That is, the polymerization reaction to obtain polyamide esters having preferable properties in this invention may be carried out by using catalysts as exemplified above at a temperature between normal temperature and 230° C. under autogenous pressure, if required, under an elevated pressure with inert gas, or, under a reduced pressure depending upon need in the course of reaction.

The polymerization reaction is effected in the presence of lactam and lactone to be polymerized together with or without a suitable organic solvent or dispersing agent.

In this invention, there is imposed no restriction on the molecular weight of the resulting polymer. Since it is not necessary that the resulting polymer per se has a mouldability, the molecular weight may be maintained at a suitably low level by using a suitable chain terminating agent. In general, however, polymers having a molecular weight ranging 2000–15,000 are used in this invention. Although the composition ratio of lactam/lactone is dependent upon the types thereof, in general, it is preferable that lactam may be contained in an amount of 50% by weight based on the weight of polyamide ester obtained.

The action and effect of these copolymers of this invention will be explained in detail by way of examples described hereinafter.

As can be noted therefrom, the action and effect may not be obtained by use of polylactam or polylactone, respectively alone, and the effect is manifested only when these components are used to form a copolymer thereof, so that composition of the copolymer is believed to have an important influence on the manifesting of effect.

The choice of combination of these lactams and lactones is also important in this invention and an injudicious combination does not necessarily guarantee a satisfactory result and leads to undesirable coloration and thermal instability of the resulting polyamide ester.

As a general guidance, a combination of ε-caprolactam and ε-caprolactone, or, the above-mentioned combination into which at least one of δ-valerolactone, pivalolactone or ω-enantholactone is further incorporated affords a satisfactory result.

No practical thermal stabilizing effect may be obtained by the use of polymer of ε-caprolactam alone. Furthermore, the melt mixing of the resulting polymer with polyoxymethylene is difficult since the polymer of ε-caprolactam alone has a melting point of about 215° C., so that there may not be obtained a uniform composition and, consequently, there is afforded only unsatisfactory results with regards to surface condition and mechanical propetries of the resulting shaped article obtained therefrom.

It must be noted that polycaprolactones alone do not contribute to the enhancement in the thermal stability of polyacetal in any manner.

Contrary to the fact that polyamide esters obtained according to the processes known heretofore generally tend to be easily colored and are thermally instable and, therefore, quite unsuitable for accomplishing the object of this invention, the effect brought about by the polyamide esters of this invention is indeed remarkable and quite unexpectable from the piror arts known heretofore.

In the prior art, for example, in order to prepare a polyamide ester by copolymerizing nylon salt, polyester composition and lactam, e.g. 0.5 mol of hexamethylenediamineadipate, 0.25 mol of adipic acid, 0.25 mol of hexanediol-1,6 and 0.5 mole of ε-caprolactam, there is required a high temperature of 270–290° C., and the resulting copolymer is colored in pale or dark brown in most cases and the whiteness is scarcely enhanced even after purification thereof by reprecipitating the same.

Thus, a polyacetal composition using the resulting polyamide ester not only colored but also drastically discolored in the processing thereof. Hence, such polyamide ester is rather inferior to copolyamide.

The reason why polyamide ester of this invention, i.e. lactam-lactone copolymer, do not cause undesirable coloration and afford an excellent stabilizing effect as compared with polyamides or copolyamides has not been clearly understood. However, it is presumed that there is caused a difference in the degree of coloration and discoloration between polyamide and polyamide ester when they are incorporated into polyacetal due to interactions with components having an adverse effect on the thermal stability, e.g. formaldehyde, formic acid, acetic acid, etc., which are formed by thermal decomposition of polyacetal, even though the coloring stability of these polyamide and polyamide ester per se are identical.

At this time, although the coloring of polyamides or copolyamides is considerably remarkable, if the conditions are the same, the polyamide esters of this invention cause only minimal or negligible discoloration and this fact can be easily observed by conducting experiments in this regard.

When incorporating polyamide into polyacetal, it is known that the coloring may be somewhat repressed by using aromatic amines together therewith. However, when using polyamide esters of this invention, the coloring may be repressed to the same extent as in the above without using aromatic amines, though the use thereof may not necessarily be prohibited in this invention.

The important features of this invention may be described as follows:

In order that a thermal stabilizer is commercially useful, it is necessary to satisfy requisites in that it is not poisonous, that it is insoluble in conventional solvents, particularly in water, and that it may be easily incorporated and compounded. The polyamide esters of this invention sufficiently satisfy all these requisites.

It is a particularly important feature of polyamide esters of this invention that they may be obtained easily and inexpensively in the form of a fine powder.

The polyamide esters which may be used in this invention may be obtained in the form of a heterogeneous suspension by using lactam-lactone as the starting materials and a suitable amount of inert reaction medium, so that the removal of catalyst by extraction, washing and drying can be carried out easily and inexpensively, and, in addition, the resulting polyamide esters can be incorporated into a composition quite easily. These outstanding advantages of this invention cannot possibly be obtained by the use of conventional copolyamides or polyamide esters prepared by condensation polymerization.

Although no particular restriction is imposed on the amount of polyamide ester used in this invention, in general, the amount ranges 0.5–10% by weight based on the weight of polyacetal.

In the present invention, the use of antioxidants and light stabilizers together with polyamide ester is preferable and, in general, conventional additives designed for these purposes may be conveniently employed. There is no reason for prohibiting the use of other types of thermal stabilizers together with the polyamide esters of this invention.

Normally, aromatic amines, phenols and bisphenols are preferable as antioxidants and, in particular, bisphenols are effectively used.

The polyacetals to which this invention is directed are high molecular weight polyacetals, i.e. polyoxymethylene or polyoxymethylene copolymers mainly comprising oxymethylene chains, the terminal groups of which are stabilized by protecting groups, which are generally obtained by polymerizing formaldehyde or cyclic oligomer thereof, or copolymerizing the same with monomers copolymerizable therewith, and acetylating, etherifying the resulting polymer or copolymer, or decomposing the same to the terminal stabilizing group.

DESCRIPTION OF THE PREFERRED EMBODIMENTS

The following examples will serve to illustrate this invention more fully and practically. It should not be construed, however, these examples restrict this invention in any way.

EXAMPLE 1

To 50 parts by weight of xylene was added 1.15 parts by weight of metallic sodium and to the resulting solution was added dropwise a 60 parts by weight of xylene solution containing 5.56 parts by weight of caprolactam with agitation under a dried nitrogen stream and the condition was maintained for 3 hours.

To the resulting mixture was then added 2.79 parts by weight of caprolactone slowly dropwise and the reaction was carried out at 138° C. for 3 hours, then to the reaction mixture was further added a mixture of 15 parts by weight of caprolactone and 85 parts by weight of caprolactam and the reaction was conducted at 138° C. for 5 hours with agitation under nitrogen stream to solidify the total reaction mixture.

The reaction product thus obtained was dissolved in methanol and acetone was added thereto to precipitate a polymer which was further extracted with hot benzene for 3 hours to remove homopolymer of lactone therefrom, washed sufficiently with methanol-water and dried under a reduced pressure at 60° C. for 3 hours.

The product which had a melting point of 191° C. and an intrinsic viscosity of 1.21 as measured in m-cresol at 25° C., which was soluble in dimethyl formamide was obtained in a yield of 97%.

The presence of amide and ester carbonyl group in the product was confirmed by an infrared absorption spectrography and the product was determined as a polyamide ester by an X-ray analysis as well. The elementary analysis values were approximately in agreement with the calculated values.

To a polyoxymethylene diacetate having an intrinsic viscosity of 1.92 as measured in a mixed solution of tetrachloroethane and p-chlorophenol in a volume ratio of 1:1 at 60° C., which was obtained by polymerizing formaldehyde and acetylating by acetic anhydride, were added 3% by weight of the powder obtained above and 0.5% by weight of 2,2-methylene-bis-(4-methyl-6-tert-butylphenol) and kneaded well, then, a plate having a thickness of 3 mm. was prepared therefrom by injection moulding.

A part of the plate thus obtained was treated in air at 220° C. for 120 minutes and there was observed substantially no coloring, though there was 3.0% of loss in weight.

The operations in which the plate was powdered and injection moulded were repeated for 3 times, observing substantially no coloration.

The exactly same test was carried out using the same polymer into which 3% by weight of nylon 6–6, 6–10 copolymer and 0.5% by weight of 2,2 - methylenebis-(4-methyl-6-tert-butylphenol) with results that the loss in weight after the same treatment at 220° C. for 120 minutes was 15.0%, that the shaped article obtained was colored in dark brown and that the reclaimed injection moulding revealed discoloration into pale brownish color in the second repeating cycle.

EXAMPLES 2–9

The instant examples show various types of polyamide esters according to this invention.

Various polyamide esters prepared according to the same procedures as described in Example 1 and in the thermal polymerization were incorporated into the same polyoxymethylene diacetate as used in Example 1 in each portion of 3% by weight together with 0.5% by weight of 2,2 - methylenebis-(4-methyl-6-tert-butylphenol) and kneaded to measure the thermal decomposition rate in air at 220° C. and to observe the coloring condition. The results obtained are shown in Table 1.

TABLE 1

| Example Numbers | Starting material for polyamide ester, percent | Polymerization conditions and type of catalyst used | Resulting polyamide ester Melting point (° C.) | Resulting polyamide ester N content (percent) | Weight loss of composition at 220° C., percent after lapse of— 30 min. | 60 min. | 90 min. | Coloration after heat treatment at 220° C. | Whiteness of injection moulded plate (3 mm. thickness) |
|---|---|---|---|---|---|---|---|---|---|
| 2 | ε-Caprolactone, 50; ε-Caprolactam, 50 | Sodium hydride 120° C. 3 hours. Suspension polymerization in xylene. | 128 | 6.1 | 0.8 | 1.5 | 3.3 | Negligible | 94 |
| 3 | ε-Caprolactone 30; ε-Caprolactam, 70 | Metallic potassium 120° C., 3 hours. Suspension polymerization in xylene. | 165 | 8.6 | 0.7 | 1.4 | 3.6 | do | 94 |
| 4 | ε-Caprolactone, 20; ε-Caprolactam, 80 | Phenylmagnesium bromide, 110° C., 3 hours. Suspension polymerization in purified kerosene. | 188 | 9.7 | 0.7 | 1.5 | 2.8 | Nil | 95 |
| 5 | ε-Caprolactone, 10; δ-Varelolactone, 10; ε-Caprolactam, 80 | Sodium hydride 40° C., 6 hours. Suspension polymerization in xylene. | 170 | 9.3 | 1.0 | 2.0 | 4.8 | Nil | 93 |
| 6 | ε-Caprolactone, 10; ε-Caprolactam, 80; Pyrrolidone, 10 | Sodium hydride 40° C., 6 hours | 200 | 10.1 | 0.9 | 2.0 | 5.8 | Slightly pale yellow | 82 |
| 7 | ε-Caprolactam, 80; ε-Caprolactone, 20 | Water 3 mol percent, 200° C., 1 hour in a sealed tube, 200° C., 2 hours under a reduced pressure. | 175 | 9.7 | 0.6 | 1.0 | 2.2 | do | 85 |
| 8 | ε-Caprolactam, 80; Pivalolactone, 20 | Sodium hydride 40° C., 6 hours | 192 | 9.2 | 0.6 | 1.0 | 2.0 | Nil | 95 |
|  | Pyrrolidone, 50; ε-Caprolactone, 50 | Sodium hydride 40° C., 6 hours | 186 | 11.2 | 1.0 | 2.6 | 6.2 | Slightly pale yellow | 82 |

The preparations of polyamide esters were carried out according to the same procedure as described in Example 1 using each portion of 3 mol percent of catalysts per mol of the total monomers, except for Example 7 in which 3 mol percent of water was used, the heating condition was at 200° C. for 1 hour and subsequently for 2 hours under a reduced pressure and the same treatment as in Example 1 was followed thereafter.

EXAMPLES 10–16

The comparison between the polyamide esters of this invention and polyamides or polyamide esters obtained according to the processes outside this invention with regard to the stabilizing effect are shown in the following Table 2. For further reference, the stabilizing effects of other types of stabilizers are also shown therein:

part by weight of diphenylamine and the resulting mixture was kneaded and extruded to give a pellet which was put into a syringe and heated at 220° C. to measure amount of gas produced therefrom.

The pellet thus obtained was repeatedly extruded at 200° C. to observe coloration thereof and practically no coloring was observed after repeating the procedures as many as four times.

The same test was conducted according to the same procedures as described above by incorporating 1.5 parts by weight of a terpolyamide (II) comprising 35% polycaprolactam, 35% polyhexamethylene adipamide and 30% polyhexamethylene sebacamide, 0.5 part by weight of 4,4-butylidenebis-(6-tert-butyl-m-cresol) and 0.1 part by weight of diphenylamine into the same polyoxymethylene diacetate referred to above.

TABLE 2

| Example Numbers | Description of thermal stabilizer | Color of stabilizer per se | Color of injection moulded article (Z value) | Weight loss after heat treatment at 220° C. (percent) after lapse of— | | | Degree of coloring after treating at 220° C. for 30 minutes |
|---|---|---|---|---|---|---|---|
| | | | | 30 min. | 60 min. | 90 min. | |
| 1 | ε-Caprolactam/ε-caprolactone, 90:10 polyamide ester. | Colorless | 98 | 0.6 | 1.2 | 2.2 | Negligible. |
| 10 | Poly-ε-caprolactam | do | 97 | 9.5 | 18.0 | 38.5 | Yellowish brown. |
| 11 | Poly-ε-caprolactone | do | 98 | 20.0 | 32.0 | 51.0 | Yellow. |
| 12 | Terpolymer comprising 35% polycaprolactam, 35% polyhexamethylene adipamide and 30% polyhexamethylene sebacamide. | Substantially colorless. | 95 | 1.2 | 2.1 | 4.0 | Brown. |
| 13 | Polyamide ester comprising 50 mol percent hexamethylene diammonium adipate, 25 mol percent adipic acid and 25 mol percent hexanediol [1]. | Yellowish brown. | 75 | 1.8 | 2.6 | 5.3 | Yellowish brown. |
| 14 | Copolymer comprising 70% polycaprolactam and 30% polyhexamethylene sebacamide. | Slightly pale yellow. | 80 | 1.7 | 4.8 | 10.0 | Brown |
| 15 | Malonamide | White crystal. | 88 | 7.0 | 15.2 | 33.0 | Pale yellow. |
| 16 | Urea | do | 92 | 11.0 | 23.6 | 38.5 | Do. |

[1] The reaction mixture was heated at 270–290° C. in an autoclave for 2 hours, then, further reacted for additional 2 hours in vacuo.

EXAMPLE 17–18

The following Table 3 illustrates that the polyamide esters of this invention are effective for thermally stabilizing various types of polyacetals.

TABLE 3

| Example Numbers | Type of polyacetal | Stabilizer used | Weight loss at 220° C. (percent) | | | Discoloring [1] |
|---|---|---|---|---|---|---|
| | | | 30 min. | 60 min. | 90 min. | |
| 17 | Polyoxymethylene diacetate.[2] | [3] 1 | 0.5 | 0.9 | 2.4 | Nil. |
| | | [3] 4 | 0.6 | 1.0 | 2.6 | Nil. |
| 18 | Copolymer having an intrinsic viscosity of 2.0.[4] | [3] 1 | 0.3 | 0.8 | 1.9 | Nil. |
| | | [3] 4 | 0.3 | 1.0 | 2.2 | Nil. |

[1] After heating at 220° C. for 30 minutes.
[2] Having an intrinsic viscosity of 2.6 obtained by acetylating polyoxymethylene prepared by irradiation polymerization of trioxane.
[3] As in example.
[4] Obtained by stabilizing a copolymer of trioxane and 2.5% by weight of dioxolane by thermal decomposition thereof.

EXAMPLE 19

Into a polyoxymethylene diacetate having an intrinsic viscosity of 2.2 as measured in p-chlorophenol at 60° C. were incorporated 1.5 parts by weight of polyamide ester (I) having a nitrogen content of 10.21% and an intrinsic viscosity of 0.96 which was obtained from 90 parts by weight of caprolactam and 10 parts by weight of caprolactone, 0.5 part by weight of 1,3,5-trimethyl-2,4,6-tris(3,5-di-t-butyl-4-hydroxybenzyl) benzene and 0.1

The following Table 4 shows comparison of amounts of gas produced in these tests:

TABLE 4

| Additive | Amount of gas produced in syringe at 220° C. (cc./1 g.) after lapse of— | | | | | |
|---|---|---|---|---|---|---|
| | 20 min. | 40 min. | 60 min. | 80 min. | 100 min. | 120 min. |
| Lactam/lactone copolymer (I) | 0.5 | 0.7 | 1.0 | 4.5 | 12.0 | 33.0 |
| Terpolyamide (II) | 2.5 | 9.0 | 21.5 | 39.5 | 69.9 | Great. |
| Polyamide ester (III) | 3.5 | 15.1 | 46.7 | 92.2 | Great | Do. |

In the reclaiming extrusion test, the discoloration was observed after repeating the procedures three times.

For further comparison, the same test was conducted by incorporating 1.5 parts by weight of polyamide ester (III) having yellowish brown color which was obtained by polymerizing 50 mol percent of caprolactam, 25 mol percent of adipic acid, 25 mol percent of hexanediol and 50 mol percent of adipic acid hexamethylenediamine salt, reprecipitating the resulting polymer from m-cresol and sufficiently washing the resulting polyamide ester, and 0.5 part by weight of 4,4-butylidenebis-(6-tert-butyl-m-cresol) into the same polyoxymethylene diacetate referred to above. A pellet was obtained therefrom according to the same kneading and extruding procedures as described above. The pellet thus obtained was colored in pale yellow from the beginning and the gas-generating and reclaiming tests performed with the instant pellet revealed no satisfactory results.

What is claimed is:
1. A thermally stabilized polyoxymethylene polymer or copolymer composition containing from about 0.5 to about 10 percent by weight, based upon the weight of the polyoxymethylene polymer or copolymer, of a polyamide ester obtained by copolymerizing from about 50 to about

90 percent by weight of a lactam with the balance a lactone, said lactam and said lactone having not less than 4 membered rings, in the presence of a catalyst selected from the group consisting of an alkali metal, an alkali metal derivative, metallic magnesium and a magnesium derivative.

2. A composition of claim 1, wherein the copolymerization is conducted at a temperature up to about 230° C.

3. A composition of claim 1, wherein the polyamide ester has a molecular weight of from about 2000 to about 15,000.

4. A composition of claim 1, wherein the polymer is a polyoxymethylene.

References Cited
UNITED STATES PATENTS

| | | | |
|---|---|---|---|
| 2,993,025 | 7/1961 | Alsup | 260—857 |
| 3,235,624 | 2/1966 | Green | 260—857 |
| 3,288,885 | 11/1966 | Green et al. | 260—857 |
| 3,355,514 | 11/1967 | Walle | 260—857 |

PAUL LIEBERMAN, Primary Examiner

U.S. Cl. X.R.

260—45.95, 78, 78.3